United States Patent
Cho

(10) Patent No.: US 9,339,010 B2
(45) Date of Patent: May 17, 2016

(54) ANIMAL TRAINING APPARATUS WITH RADIO TRANSCEIVER

(71) Applicant: Amis.Co., Ltd, Puchon (KR)

(72) Inventor: Yong Joon Cho, Bucheon-si (KR)

(73) Assignee: Yong Joon Cho, Bucheon-Si (KR)

( * ) Notice: Subject to any disclaimer, the term of this patent is extended or adjusted under 35 U.S.C. 154(b) by 272 days.

(21) Appl. No.: 13/924,062

(22) Filed: Jun. 21, 2013

(65) Prior Publication Data

US 2014/0283758 A1    Sep. 25, 2014

(30) Foreign Application Priority Data

Mar. 22, 2013    (KR) .................. 10-2013-0031092

(51) Int. Cl.
   *A01K 15/02*    (2006.01)

(52) U.S. Cl.
   CPC .................. *A01K 15/021* (2013.01)

(58) Field of Classification Search
   CPC ... A01K 15/02; A01K 15/021; A01K 15/022; A01K 15/023; A01K 15/029
   USPC .......... 119/720, 719, 718, 712, 856, 858, 859
   See application file for complete search history.

(56) References Cited

U.S. PATENT DOCUMENTS

| | | | |
|---|---|---|---|
| 5,666,908 A | 9/1997 | So | |
| 6,598,563 B2* | 7/2003 | Kim et al. | 119/720 |
| 8,181,607 B2* | 5/2012 | Kim | 119/720 |
| 2007/0056526 A1* | 3/2007 | Gianladis et al. | 119/721 |

FOREIGN PATENT DOCUMENTS

| | | |
|---|---|---|
| KR | 100257879 B1 | 3/2000 |
| KR | 1020020022567 A | 3/2002 |
| KR | 1020060104676 A | 10/2006 |
| KR | 1020110014851 A | 2/2011 |
| KR | 1020110044444 A | 4/2011 |
| KR | 1020120071352 A | 7/2012 |

OTHER PUBLICATIONS

Grant Decision for related KR Application No. 10-2013-0031092, dated Oct. 21, 2014.
Office Action for related KR Application No. 10-2013-0031092, dated Mar. 25, 2014.
Prior Art Search Report for related KR Application No. 10-2013-0031092, dated Feb. 10, 2015.

* cited by examiner

*Primary Examiner* — Joshua Huson
(74) *Attorney, Agent, or Firm* — Westman, Champlin & Koehler, P.A.; Z. Peter Sawicki; Amanda M. Prose

(57) ABSTRACT

An animal training apparatus with a radio transceiver is provided, which includes an encoder/tact switch setting animal stimulation levels, a mode designation input unit, a stimulation command input unit, an ID code setting unit, an RF radio signal generation unit, an antenna switch, a signal amplification unit, a received signal demodulation unit, a low-pass filter removing harmonic waves in a transmitted RF signal, a microphone inputting a user input audio signal, an audio output unit, and a first microprocessor operating in a radio transceiver mode if a user command is input, and generating data that corresponds to the stimulation level if a stimulation command is input. The animal training apparatus can subdivide and continuously set stimulation levels for animals, set levels that suit respective animals in the case of multi-dog training, and provide easiness to carry about through condensation of the training apparatus and the radio transceiver into one product.

4 Claims, 2 Drawing Sheets

ANIMAL TRAINING APPARATUS WITH RADIO TRANSCEIVER

CROSS-REFERENCE TO RELATED APPLICATION

This application is based on and claims priority from Korean Patent Application No. 10-2013-0031092, filed on Mar. 22, 2013 in the Korean Intellectual Property Office, the disclosure of which is incorporated herein in its entirety by reference.

BACKGROUND OF THE INVENTION

1. Field of the Invention

The present invention relates to an animal training apparatus with a radio transceiver. More particularly, the present invention relates to an animal training apparatus with a radio transceiver, which can subdivide and continuously set stimulation levels for animals to be trained, set levels that suit respective animals in the case of multi-dog training, and provide easiness to carry about as the training apparatus combined with the radio transceiver through condensation of the training apparatus and the radio transceiver into one product.

2. Description of the Prior Art

In general, an animal training apparatus is worn around the neck of an animal or is mounted on a part of an animal body to train the animal through application of electrical stimulation to the animal.

An animal training device in the related art is disclosed in U.S. Pat. No. 5,666,908 filed by the inventor of this application on Jul. 5, 1995 and registered on Sep. 16, 1997.

The animal training device disclosed in the U.S. Pat. No. 5,666,908 is provided with a transmitter and a receiver.

The transmitter transmits a radio signal to apply electrical stimulation to an animal in accordance with an operation of a trainer who trains the animal. The transmitter includes a stimulation adjustment controller setting levels of and impulsive wave to be output from the receiver, a power switch controlling transmission of a radio signal that is set by the stimulation adjustment controller, and a transmission antenna transmitting the radio signal which includes indication information of an impulsive wave level according to conditions set by the stimulation adjustment controller and indication (ID) code information for determining the corresponding receiver. Further, the receiver receives the radio signal that is transmitted from the transmission antenna or the transmitter, and generates a signal waveform that is set by the stimulation adjustment controller of the transmitter for a predetermined time. The receiver includes a reception antenna receiving the radio signal transmitted from the transmission antenna of the transmitter, a receiver unit amplifying and detecting the radio signal that is received through the reception antenna, and electrodes fixedly installed toward an inside of a collar to apply the impulsive wave that is output from the receiver unit to the animal.

The receiver unit includes a detection means for receiving the radio signal that is received through the reception antenna and demodulating the radio signal into an impulsive wave of a predetermined level that is set by the stimulation adjustment controller of the transmitter, a microprocessor for reception inquiring whether the signal that is demodulated by the detection means is a signal that is transmitted by a trainer and outputting an impulsive wave control signal of a level that is set by the stimulation adjustment controller of the transmitter if the demodulated signal is the signal transmitted by the trainer, an amplification means for being switched according to the control signal output from the microprocessor for reception and amplifying the control signal at a predetermined level, an impulsive wave generation means for generating high-voltage impulsive wave according to the switching and amplification of the amplification means, and a pair of electrodes outputting the impulsive wave that is generated by the impulsive wave generation means.

According to the animal training device in the related art as described above, however, the stimulation adjustment controller of the transmitter is composed of a selector switch that is a mechanical switch, and thus the levels of the impulsive wave to be output from the receiver are unable to be finely set by stages.

Further, since the animal training device in the related art trains the animal by constantly applying the impulsive wave of a predetermined level, which is set by the stimulation adjustment controller that is the selector switch, to the animal during animal training, it is difficult to train the animal that is weak against the impulsive wave.

Further, the animal training apparatus and the radio transceiver must be separately carried during animal training to cause inconvenience in use.

SUMMARY OF THE INVENTION

Therefore, the present invention has been made to solve the above-mentioned problems occurring in the related art, and one subject to be achieved by the present invention is to provide an animal training apparatus with a radio transceiver, which can subdivide and continuously set stimulation levels for animals, set levels that suit respective animals in the case of multi-dog training, and provide easiness to carry about as the training apparatus combined with the radio transceiver through condensation of the training apparatus and the radio transceiver into one product.

In one aspect of the present invention, there is provided an animal training apparatus, which includes an encoder/tact switch setting radio transceiver channels and animal stimulation levels; a mode designation input unit performing switching between the radio transceiver channel setting of the encoder/tact switch and the animal stimulation level setting of the training apparatus; a stimulation command input unit receiving an input of an animal stimulation command according to a user's key operation; an ID code setting unit setting an ID code of the animal training apparatus; an RF radio signal generation unit generating an RF radio signal that is necessary during signal transmission or signal reception; an antenna switch performing switching between the signal transmission and the signal reception; a signal amplification unit amplifying the RF radio signal generated by the RF radio signal generation unit and inputting the amplified RF radio signal to the antenna switch during the signal transmission; a received signal demodulation unit demodulating a received signal input from the antenna switch and inputting the demodulated signal to the RF radio signal generation unit; a low-pass filter (LPF) removing harmonic waves except for a basic wave in a transmitted RF signal input from the antenna switch; a microphone converting a user input audio signal into an electrical signal and inputting the converted electrical signal to the RF radio signal generation unit; an audio output unit converting the received RF signal output from the RF radio signal generation unit into an audio signal and outputting the converted audio signal; and a first microprocessor operating in a radio transceiver mode if a user command is input, generating data that corresponds to the stimulation level set by the encoder/tact switch if the stimulation command is input from the stimulation command input unit instead of the user command, and controlling an RF radio signal generation operation of the RF radio signal generation unit so that the generated data and the ID code of the training apparatus that is set by the ID code setting unit can be carried.

Preferably, the animal training apparatus according to the aspect of the present invention may further include a high-voltage stimulation generation unit generating a stimulation signal that corresponds to the stimulation level; a stimulation terminal applying the stimulation that is generated by the high-voltage stimulation generation unit to an animal through electrodes; a signal demodulation unit demodulating the RF radio signal received through the antenna; and a second microprocessor controlling a stimulation signal generation operation of the high-voltage stimulation generation unit according to the data demodulated by the signal demodulation unit.

The animal training apparatus according to the aspect of the present invention may further include a flash key; and a first flash driver connected to an LED to control a blinking operation of the connected LED, wherein the second microprocessor controls the LED blinking operation of the first flash driver so that the LED operates as a flash if a control signal, which is generated when the flash key is pressed, is input from the first microprocessor in a predetermined time.

Preferably, the animal training apparatus according to the aspect of the present invention may further include a second flash driver connected to the LED to control the blinking operation of the connected LED if the flash key is pressed, wherein the first microprocessor controls the LED blinking operation of the second flash driver so that the LED operates as a flash if the flash key is pressed over the predetermined time.

The animal training apparatus according to the aspect of the present invention may further include an emergency processing key to cope with momentary and dangerous situations, wherein the first microprocessor controls the RF radio signal generation operation of the RF radio signal generation unit so that a stimulation signal which corresponds to a high-strength stimulation level that is higher than a currently set stimulation level for a predetermined level if the emergency processing key is pressed according to the user's key operation.

The animal training apparatus according to the aspect of the present invention may further include a vibration command input unit for animal training or warning by vibration that is not the stimulation, wherein the first microprocessor controls the RF radio signal generation operation of the RF radio signal generation unit so that a vibration signal which corresponds to a vibration level that is set by the encoder/tact switch if a vibration command is input from the vibration command input unit.

According to the present invention, the stimulation levels for animals to be trained can be subdivided and continuously set, and the levels that suit respective animals can be set in the case of multi-dog training. Further, the easiness to carry about as the training apparatus combined with the radio transceiver can be provided through condensation of the training apparatus and the radio transceiver into one product.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
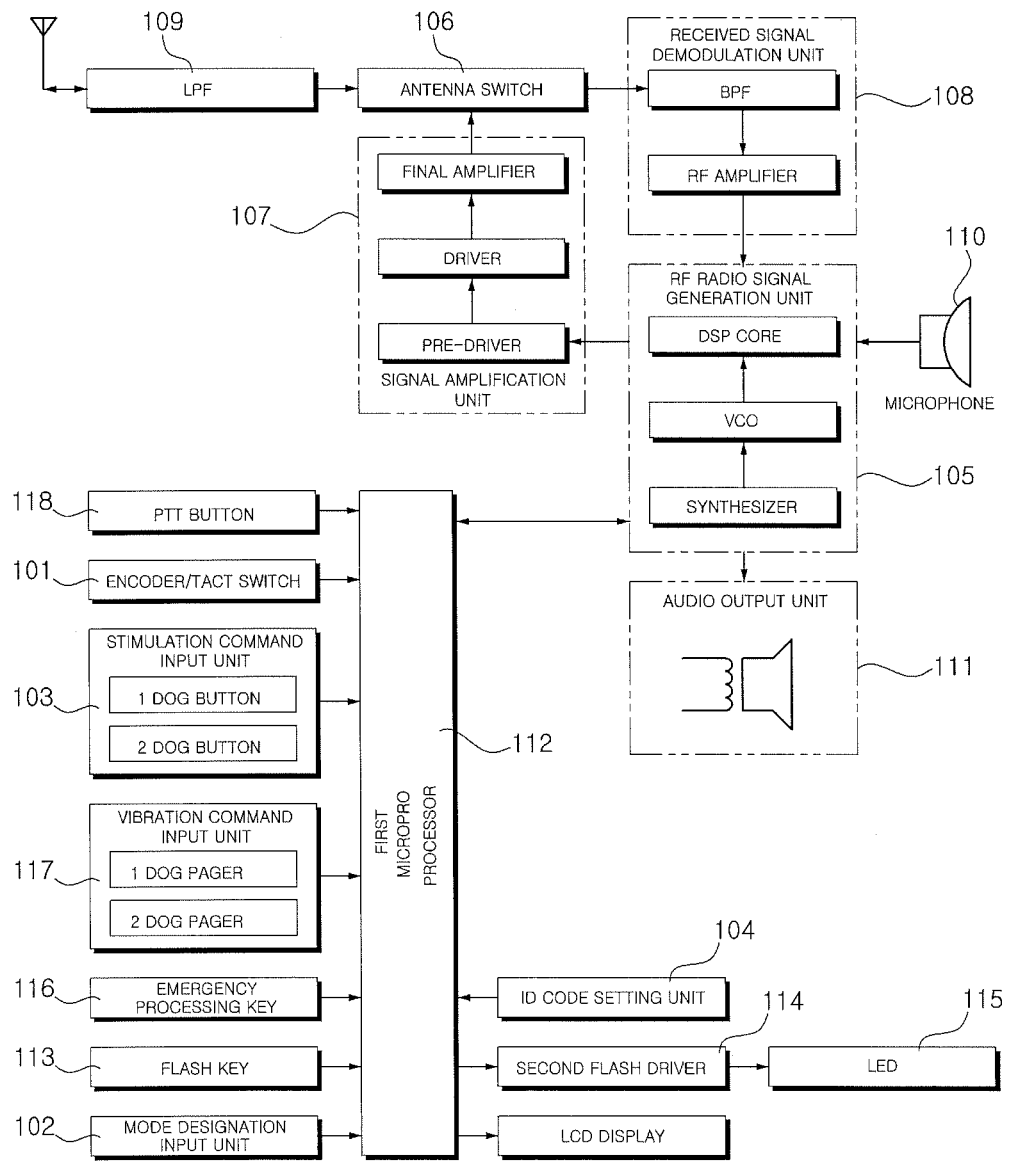
FIG. 1 is a diagram illustrating the configuration of a transmitter of an animal training apparatus with a radio transceiver according to an embodiment of the present invention.

Hereinafter, preferred embodiments of the present invention will be described in detail with reference to the accompanying drawings.

The matters defined in the description, such as the detailed construction and elements, are nothing but specific details provided to assist those of ordinary skill in the art in a comprehensive understanding of the invention, and thus the present invention is not limited to the embodiments disclosed hereinafter.

In order to clearly describe the present invention, portions that are not related to the description are omitted, and in the entire description of the present invention, the same drawing reference numerals are used for the same elements across various figures.

In the following description of the present invention, the terms used are for explaining embodiments of the present invention, but do not limit the scope of the present invention. The term "comprise" and/or "include" used in the description and claims means that one or more other components are not excluded in addition to the described components.

Figure 2:
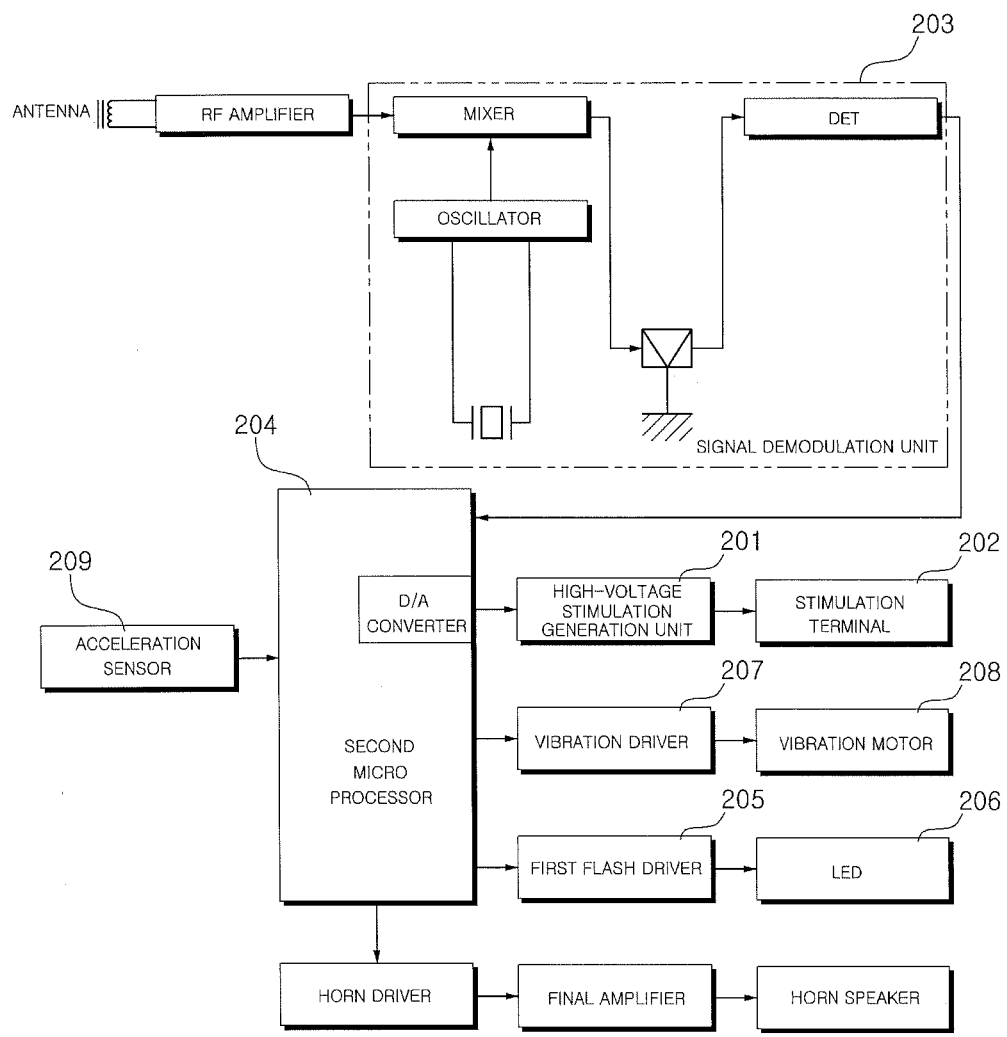
FIG. 2 is a diagram illustrating the configuration of a receiver of an animal training apparatus with a radio transceiver according to an embodiment of the present invention.

FIGS. 1 and 2 are diagrams illustrating the configuration of an animal training apparatus with a radio transceiver according to an embodiment of the present invention.

Specifically, FIG. 1 is a diagram illustrating the configuration of a transmitter of an animal training apparatus with a radio transceiver according to an embodiment of the present invention, and FIG. 2 is a diagram illustrating the configuration of a receiver of an animal training apparatus with a radio transceiver according to an embodiment of the present invention.

As illustrated in FIGS. 1 and 2, an animal training apparatus with a radio transceiver according to an embodiment of the present invention briefly includes a transmitter and a receiver.

The transmitter includes an encoder/tact switch 101 setting radio transceiver channels and animal stimulation levels; a mode designation input unit 102 performing switching between the radio transceiver channel setting of the encoder/tact switch 101 and the animal stimulation level setting of the training apparatus; a stimulation command input unit 103 receiving an input of an animal stimulation command according to a user's key operation; an ID code setting unit 104 setting an ID code of the animal training apparatus; an RF radio signal generation unit 105 generating an RE radio signal that is necessary during signal transmission or signal reception; an antenna switch 106 performing switching between the signal transmission and the signal reception; a signal amplification unit 107 amplifying the RF radio signal generated by the RF radio signal generation unit 105 and inputting the amplified RF radio signal to the antenna switch 106 during the signal transmission; a received signal demodulation unit 108 demodulating a received signal input from the antenna switch 106 and inputting the demodulated signal to the RF radio signal generation unit 105; a low-pass filter (LPF) 109 removing harmonic waves except for a basic wave in a transmitted RF signal input from the antenna switch 106; a microphone 110 converting a user input audio signal into an electrical signal and inputting the converted electrical signal to the RF radio signal generation unit 105; an audio output unit 111 converting the received RE signal output from the RF radio signal generation unit 105 into an audio signal and outputting the converted audio signal; and a first microprocessor 112 operating in a radio transceiver mode if a user command is input (e.g., a PTT button is pressed), generating data that corresponds to the stimulation level set by the encoder/tact switch 101 if the stimulation command is input from the stimulation command input unit 103 instead of the user command, and controlling an RF radio signal generation operation of the RF radio signal generation unit 105 so that the generated data and the ID code of the training apparatus that is set by the ID code setting unit 104 can be carried.

Preferably, the receiver includes a high-voltage stimulation generation unit 201 generating a stimulation signal that corresponds to the stimulation level; a stimulation terminal 202 applying the stimulation that is generated by the high-voltage stimulation generation unit 201 to an animal through electrodes; a signal demodulation unit 203 demodulating the RF radio signal received through the antenna; and a second microprocessor 204 controlling a stimulation signal generation operation of the high-voltage stimulation generation unit 201 according to the data demodulated by the signal demodulation unit 201.

The signal demodulation unit 203 is composed of a mixer, an oscillator (OSC), and a detector (DET). The mixer receives an RF signal supplied from an RF amplifier and an oscillation signal from the OSC, and produces an intermediate frequency that is a second frequency. The OSC is a self oscillation means to obtain the second intermediate frequency. The DET detects functional and ID signals sent from the transmitter as detection means. Crystal is a vibration device for oscillation to obtain the second intermediate frequency, and a filter performs filtering of noises included in the intermediate frequency produced by the mixer.

The receiver may further include an acceleration sensor 209 or a motion sensor for sensing motion of an animal, and a first flash driver 205 controlling a blinking operation of an LED if the flash key 113 is pressed in the transmitter. The second micro processor 204 controls the LED blinking operation of the first flash driver 205 so that the LED operates as a flash to enable a trainer to grasp the position of the animal at night if the control signal, which is generated when the flash key 113 is pressed, is input from the first microprocessor 204 in a predetermined time. A constant current system may be adopted to obtain constant heat and brightness of the LED.

Here, the encoder/tact switch 101 is to adjust the level of stimulation of the animal training apparatus, and more specifically, is a user interface means for setting radio transceiver channels and animal stimulation levels of the animal training apparatus. For example, if a user designates a first mode through the mode designation input unit 102, the user can set a desired radio channel (e.g., CH-01) by turning the encoder/tact switch 101, while if the user designates a second mode through the mode designation input unit 102, the user can set a desired stimulation level by turning the encoder/tact switch 101. At this time, if the radio channel or the stimulation level is set, the user may store or release the set radio channel or stimulation level by pressing the tact key.

If the encoder/tact switch 101 that is the stimulation adjustment means is implemented by a selector that is a mechanical switch as in the related art, the stimulation levels are unable to be subdivided, and in the case of multi-dog training, it is not possible to set levels that suit respective animals. Further, even in the case where a volume is adopted, the stimulation levels can be subdivided, but it is not possible to set the levels that suit the respective animals in the case of using the multi-dog training. By contrast, according to the present invention, the stimulation levels for animals to be trained can be subdivided and continuously set using the encoder switch that is turned by 360°, and the levels that suit the respective animals can be set in the case of the multi-dog training.

The mode designation input unit 102 is a user interface means for performing switching between the radio transceiver channel setting of the encoder/tact switch 101 and the animal stimulation level setting of the training apparatus. For example, if the user designates the first mode through the mode designation input unit 102, information that is set by turning the encoder/tact switch 101 becomes radio channel (e.g., CH-01) information, and if the user designates the second mode through the mode designation input unit 102, the information that is set by turning the encoder/tact switch 101 becomes stimulation level information of the animal to be trained.

The stimulation command input unit 103 is to generate the animal stimulation command according to the user's key operation and to input the animal stimulation command to the first microprocessor 112. Specifically, the stimulation command input unit 103 may be composed of a first button for commanding one animal, e.g., 1 Dog, and a second button for commanding another animal, e.g., 2 Dog.

The ID code setting unit 104 sets the function of the radio transceiver and the ID code of the animal training apparatus.

The RF radio signal generation unit 105 is a PLL circuit that generates frequencies that are necessary for transmission and many RF radio signals that are necessary for reception, and is composed of a synthesizer, a VCO, and a DSP core.

The antenna switch 106 is required to perform transmission and reception through one antenna, and performs switching between the signal transmission and the signal reception according to the transmission/reception mode.

The signal amplification unit 107 amplifies the RF radio signal generated by the RF radio signal generation unit 105 and inputs the amplified RF radio signal to the antenna switch 106 during the signal transmission. The signal amplification unit 107 may include a pre-driver amplifying a weak signal that is generated from the RF radio signal generation unit 105, a driver amplifying the RF output that is amplified by the pre-driver to operate the next stage, and a final amplifier amplifying the RF signal so that the RF signal can reach a distance that is necessary during transmission and reception and inputting the amplified RF signal to the antenna switch 106.

The received signal demodulation unit 108 demodulates the received signal input from the antenna switch 106 and inputs the demodulated signal to the RF radio signal generation unit 105. The received signal demodulation unit 108 may include a band pass filter (BPF) filtering the received signal that is input from the antenna switch 106 to pass only a necessary frequency band, and an RF amplifier AMP amplifying a weak RF signal that is induced in the antenna and inputting the amplified RF signal to the RF radio signal generation unit 105.

The low-pass filter (LPF) 109 is a means for removing harmonic waves except for a basic wave in the transmitted RF signal that is input from the antenna switch 106.

The microphone 110 converts the user input audio signal into an electrical signal and inputs the converted electrical signal to the RF radio signal generation unit 105.

The audio output unit 111 converts the received RF signal output from the RF radio signal generation unit 105 into an audio signal and outputs the converted audio signal, and may include an audio amplifier and a speaker.

The first microprocessor 112 operates in the radio transceiver mode if the user command is input, generates data that corresponds to the stimulation level set by the encoder/tact switch 101 if the stimulation command is input from the stimulation command input unit 103 instead of the user command, and controls the RF radio signal generation operation of the RF radio signal generation unit 105 so that the generated data and the ID code of the training apparatus that is set by the ID code setting unit 104 can be carried.

The animal training apparatus according to the aspect of the present invention further includes an emergency processing key to cope with momentary and dangerous situations (e.g., when emergency situations occur, such as when the animals bite shoes or fight with each other 116, or when it is not possible to control the situation with the normally set level). The first microprocessor 112 generates data that corresponds to a high-strength stimulation level that is higher than a currently set stimulation level for a predetermined level (e.g., by 20 stages) if the emergency processing key is pressed according to the user's key operation. For example, the emergency stimulation level may be set to be higher than the currently set level by 20 stages, and in this case, if it is assumed that 1 Dog is set to $35^{th}$ stage and 2 Dog is set to $60^{th}$ stage, stimulation levels of $55^{th}$ stage and $80^{th}$ stage are transmitted.

In addition, the animal training apparatus according to the aspect of the present invention further includes a second flash driver 114 connected to the LED to control the blinking operation of the connected LED if the flash key 113 is pressed. The first microprocessor 112 controls the LED blinking operation of the second flash driver 14 so that the LED operates as a flash if the flash key 113 is pressed over the predetermined time (e.g., 2 seconds). For example, if the flash key 113 is pressed for 2 seconds or less and then is released, the flash of the receiver is turned on/off, and if the flash key 113 is pressed over 2 seconds and then is released, the flash that is mounted on a portable device is turned on/off to be used at night.

Hereinafter, the operation of the animal training apparatus with a radio transceiver according to an embodiment of the present invention illustrated in FIGS. 1 and 2 will be described.

(1) Animal Training Operation (Stimulation)

First, a user selects the second mode for setting the animal stimulation level through the mode designation input unit 102 and sets a desired stimulation level to be applied to the animal by turning the encoder/tact switch 101.

Then, the user inputs a stimulation command to apply the stimulation to the animal through the stimulation command input unit 103.

Then, the first microprocessor 112 generates data that corresponds to the stimulation level that is set by the encoder/tact switch 101, and controls the RF radio signal generation operation of the RF radio signal generation unit 105 so that the generated data and the ID code of the training apparatus are carried.

That is, the data that corresponds to the stimulation level and the ID code of the training apparatus that is set by the ID code setting unit 104 are supplied to the RF radio signal generation unit 105 by the first microprocessor 112.

Then, the RF radio signal generated by the RF radio signal generation unit 105 is amplified by the signal amplification unit (e.g., a pre-driver, a driver, and a final amplifier) 107, is output to the antenna switch 106 of which the mode has been shifted to a TX mode. The RF radio signal output from the antenna switch passes through the low-pass filter 109 to remove the harmonic components, and then is radiated as a radio wave through the antenna.

Then, the signal demodulation unit 203 of the receiver (e.g., that can be worn around the neck of the animal) demodulates the RF radio signal that is received through the antenna.

Then, the second microprocessor 204 controls the stimulation signal generation operation of the high-voltage stimulation generation unit 201 according to the data demodulated by the signal demodulation unit 203, and if the stimulation is generated by the high-voltage stimulation generation unit 201, the stimulation terminal 202 applies the stimulation that is generated by the high-voltage stimulation generation unit 201 to the animal through the electrodes.

Through this, the user can stimulate the animal as high as the stimulation level desired by the user.

(2) Animal Training Operation (Vibration)

First, a user selects the second mode for setting the animal stimulation level through the mode designation input unit 102 and sets a desired stimulation level to be applied to the animal by turning the encoder/tact switch 101.

Then, the user inputs a vibration command to provide vibrations to the animal through the vibration command input unit 117.

Then, the first microprocessor 112 generates data that corresponds to the stimulation level that is set by the encoder/tact switch 101, and controls the RF radio signal generation operation of the RF radio signal generation unit 105 so that the generated data and the ID code of the training apparatus that is set by the ID code setting unit 104 are carried.

That is, the data that corresponds to the vibration level and the ID code of the training apparatus that is set by the ID code setting unit 104 are supplied to the RF radio signal generation unit 105 by the first microprocessor 112.

Then, the RF radio signal generated by the RF radio signal generation unit 105 is amplified by the signal amplification unit (e.g., a pre-driver, a driver, and a final amplifier) 107, is output to the antenna switch 106 of which the mode has been shifted to a TX mode. The RF radio signal output from the antenna switch passes through the low-pass filter 109 to remove the harmonic components, and then is radiated as a radio wave through the antenna.

Then, the signal demodulation unit 203 of the receiver (e.g., that can be worn around the neck of the animal) demodulates the RF radio signal that is received through the antenna.

Then, the second microprocessor 204 controls the vibration generation operation of a vibration driver 207 according to the data demodulated by the signal demodulation unit 203, and a vibration motor 208 applies the vibrations to the animal through the driving operation of the vibration driver 207.

Through this, the user can provide vibrations to the animal to be trained as high as the vibration level desired by the user.

(3) Emergency Processing Operation

If an emergency situation occurs (e.g., if the animals bite shoes of the trainer or fight with each other, and thus it is not possible to control the situation with the normally set level), and thus the user presses the emergency processing key 116, the first microprocessor 112 generates data that corresponds to a high-strength stimulation level that is higher than the currently set stimulation level for a predetermined level (e.g., by 20 stages), and controls the RF radio signal generation operation of the RF radio signal generation unit 105 so that the generated data and the ID code of the training apparatus that is set by the ID code setting unit 104 can be carried.

For example, the emergency stimulation level may be set to be higher than the currently set level by 20 stages, and in this case, if it is assumed that 1 Dog is set to 35$^{th}$ stage and 2 Dog is set to 60$^{th}$ stage, stimulation (or vibration) levels of 55$^{th}$ stage and 80$^{th}$ stage are transmitted.

The detailed transmission operation is as described above.

(4) Flash Operation

First, if the user presses the flash key 113 to grasp the position of the animal at night, i.e., if the flash key 113 is pressed in a predetermined time (e.g., 2 seconds), the second microprocessor 204 controls the LED blinking operation of the first flash driver 114 so that the user can grasp the position of the animal at night.

By contrast, if the user presses the flash key over the predetermined time, the first microprocessor 112 senses this, and controls the LED turn-on operation of the second flash driver 114 so that the animal training apparatus can be used as a flashlight.

For example, if the flash key is pressed for 2 seconds or less and then is released, the flash of the receiver is turned on/off, and if the flash key is pressed over 2 seconds and then is released, the flash that is mounted on the transmitter is turned on/off to be used at night.

Although preferred embodiments of the present invention have been described for illustrative purposes, those skilled in the art will appreciate that various modifications, additions and substitutions are possible, without departing from the scope and spirit of the invention as disclosed in the accompanying claims. Accordingly, it can be understood that the present invention is not limited to the embodiments as disclosed herein, but is only defined within the scope of the appended claims.

What is claimed is:

1. An animal training apparatus with a radio transceiver, comprising:
   a portable handheld radio transmitter comprising:
      an encoder/tact switch setting radio transceiver channels and animal stimulation levels;
      a mode designation input unit performing switching between the radio transceiver channel setting of the encoder/tact switch and the animal stimulation level setting of the training apparatus;
      a stimulation command input unit receiving an input of an animal stimulation command according to a user's key operation;
      an ID code setting unit setting an ID code of the animal training apparatus;
      an RF radio signal generation unit generating an RF radio signal that is necessary during signal transmission or signal reception;
      an antenna switch performing switching between the signal transmission and the signal reception;
      a signal amplification unit amplifying the RF radio signal generated by the RF radio signal generation unit and inputting the amplified RF radio signal to the antenna switch during the signal transmission;
      a received signal demodulation unit demodulating a received signal input from the antenna switch and inputting the demodulated signal to the RF radio signal generation unit;
      a low-pass filter (LPF) removing harmonic waves except for a basic wave in a transmitted RF signal input from the antenna switch;
      a microphone converting a user input audio signal into an electrical signal and inputting the converted electrical signal to the RF radio signal generation unit;
      an audio output unit converting the received RF signal output from the RF radio signal generation unit into an audio signal and outputting the converted audio signal;
      a first microprocessor operating in a radio transceiver mode if a user command is input, generating data that corresponds to the stimulation level set by the encoder/tact switch if the stimulation command is input from the stimulation command input unit instead of the user command, and controlling an RF radio signal generation operation of the RF radio signal generation unit so that the generated data and the ID code of the training apparatus that is set by the ID code setting unit can be carried; and
   at least one receiver collar assembly operably configured to be worn by an animal during training comprising:
      a high-voltage stimulation generation unit generating a stimulation signal that corresponds to the stimulation level;
      a stimulation terminal applying the stimulation that is generated by the high-voltage stimulation generation unit to an animal through electrodes;
      a signal demodulation unit demodulating the RF radio signal received through the antenna;
      a second microprocessor controlling a stimulation signal generation operation of the high-voltage stimulation generation unit according to the data demodulated by the signal demodulation unit, and
      a vibration command input unit for animal training or warning by vibration that is not the stimulation,
   wherein the first microprocessor controls the RF radio signal generation operation of the RF radio signal generation unit so that a vibration signal which corresponds to a vibration level that is set by the encoder/tact switch if a vibration command is input from the vibration command input unit, so that the user can provide the vibration to the animal to be trained as high as the vibration level desired by the user.

2. The animal training apparatus according to claim 1, further comprising:
   a flash key; and
   a first flash driver connected to an LED to control a blinking operation of the connected LED,
   wherein the second microprocessor controls the LED blinking operation of the first flash driver so that the LED operates as a flash if a control signal, which is generated when the flash key is pressed, is input from the first microprocessor in a predetermined time.

3. The animal training apparatus according to claim 2, further comprising a second flash driver connected to the LED to control the blinking operation of the connected LED if the flash key is pressed,
   wherein the first microprocessor controls the LED blinking operation of the second flash driver so that the LED operates as a flash if the flash key is pressed over the predetermined time.

4. The animal training apparatus according to claim 1, further comprising an emergency processing key to cope with momentary and dangerous situations,
   wherein the first microprocessor controls the RF radio signal generation operation of the RE radio signal generation unit so that a stimulation signal which corresponds to a high-strength stimulation level that is higher than a currently set stimulation level for a predetermined level if the emergency processing key is pressed according to the user's key operation.

* * * * *